US010388071B2

(12) United States Patent
Rico

(10) Patent No.: US 10,388,071 B2
(45) Date of Patent: Aug. 20, 2019

(54) VIRTUAL REALITY (VR) CADENCE PROFILE ADJUSTMENTS FOR NAVIGATING VR USERS IN VR ENVIRONMENTS

(71) Applicant: Sony Interactive Entertainment Inc.

(72) Inventor: Javier Fernandez Rico, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 15/081,758

(22) Filed: Mar. 25, 2016

(65) Prior Publication Data

US 2017/0278306 A1    Sep. 28, 2017

(51) Int. Cl.
G06F 3/01 (2006.01)
G02B 27/00 (2006.01)
G02B 27/01 (2006.01)
G06T 19/00 (2011.01)
G06F 3/0481 (2013.01)

(52) U.S. Cl.
CPC ........ *G06T 19/006* (2013.01); *G02B 27/0093* (2013.01); *G02B 27/017* (2013.01); *G06F 3/011* (2013.01); *G06F 3/04815* (2013.01); *G06T 19/003* (2013.01); *G02B 2027/0134* (2013.01); *G02B 2027/0138* (2013.01); *G02B 2027/0187* (2013.01); *G06F 2203/012* (2013.01)

(58) Field of Classification Search
CPC ..... G06T 19/006; G06T 19/003; G06F 3/011; G06F 3/04815; G06F 2203/012; G02B 27/017; G02B 2027/0178; G02B 27/0093; G02B 2027/0187; G02B 2027/0138; G02B 2027/0134

See application file for complete search history.

(56) References Cited

U.S. PATENT DOCUMENTS

| | | | | |
|---|---|---|---|---|
| 6,050,822 A | * | 4/2000 | Faughn | G06F 3/011 345/952 |
| 2004/0214690 A1 | * | 10/2004 | Couvillion, Jr. | G06F 3/011 482/8 |
| 2012/0262558 A1 | * | 10/2012 | Boger | G02B 27/0093 348/61 |
| 2016/0219272 A1 | * | 7/2016 | Fujimaki | H04N 13/344 |

\* cited by examiner

*Primary Examiner* — Brent D Castiaux
(74) *Attorney, Agent, or Firm* — Penilla IP, APC

(57) ABSTRACT

A method, system, computer readable media and cloud systems are provided for adjusting image data presented in a head mounted display (HMD). One method includes executing a virtual reality (VR) session for an HMD user. The VR session is configured to present image data to a display of the HMD. The image data is for a VR environment that includes a VR user controlled by the HMD user. The method further includes adjusting the image data presented on the display of the HMD with the cadence profile when the VR user is moved in the VR environment by the HMD user. The adjusting causes a movement of a camera view for the image data that is for the VR environment as presented on the display of the HMD. In some examples, the cadence profile substantially replicates a rhythmic movement of a person while moving in a real world environment.

24 Claims, 10 Drawing Sheets

VIRTUAL REALITY (VR) CADENCE PROFILE ADJUSTMENTS FOR NAVIGATING VR USERS IN VR ENVIRONMENTS

BACKGROUND

1. Field of the Disclosure

The present disclosure relates to virtual reality (VR) environment content presented in head mounted displays (HMDs), and methods and systems for adjusting image content to reduce motion sickness while moving about VR scenes.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

However, when HMD users navigate within a VR environment, motion sickness may occur. Motion sickness may occur, for example, if the movement by a VR user within a VR environment does not match the type of movements that are expected by the HMD user in real-world environments. Thus, as VR environments continue to become realistic, HMD users will increasingly perceive themselves as being inside the VR environment. Unfortunately, a mental disconnect currently exists between what HMD users see in the real-world to what is displayed in the VR environment. This disconnect is believed to be one source of motion sickness, which may be experienced by HMD users.

It is in this context that embodiments of the disclosure arise.

SUMMARY

Implementations of the present disclosure include methods and systems that enable identification of cadence profiles for specific HMD users, and implementation of the cadence profiles to modify the image data presented to the HMD display. A cadence profile represents or approximates a type of movement, for example, of a user's head when the user is walking or moving in normal real-world life. In one embodiment, it is possible to detect this type of movement using one or more inertial sensors, and therefore correlating specific movements to specific cadence profiles. The cadence profile can then be used in a virtual reality environment, so that movement within the virtual reality environment proceeds with an applied cadence profile, which matches or is approximated to the type of movement performed by a VR user in the real world environment.

In one embodiment, a method for adjusting image data presented in a head mounted display (HMD) is disclosed. The method includes executing a virtual reality (VR) session for an HMD user. The VR session is configured to present image data to a display of the HMD. The image data is for a VR environment that includes a VR user controlled by the HMD user. The method further includes adjusting the image data presented on the display of the HMD with the cadence profile when the VR user is moved in the VR environment by the HMD user. The adjusting causes a movement of a camera view for the image data that is for the VR environment as presented on the display of the HMD.

In some embodiments, the cadence profile substantially replicates a rhythmic movement of a person while moving in a real world environment, and wherein the cadence profile is obtained from a database.

In some embodiments, the database includes one or more cadence profiles obtained from a calibration operation performed by the HMD user. The calibration operation includes detecting motion from inertial sensors of the HMD when the HMD user is instructed to move in accordance with in one more types of movements.

In some embodiments, a user account used for the VR session is associated with one or more of the cadence profiles obtained from one or more calibration operations performed by the HMD user in the session or in one or more previous sessions.

In some embodiments, the database includes one or more models of cadence profiles, each model being for a type of movement.

In some embodiments, the method further includes implementing a different cadence profile when a different type of movement is detected in the VR user as the VR user moves about the VR environment.

In some embodiments, the adjusting of the image data is discontinued when the VR user is not moving in the VR environment or is moving within the VR environment in a VR object that does not have a cadence profile.

In some embodiments, movement of the VR user in the VR environment relates to moving from one location to another location within the VR environment. This movement excludes moving associated with looking around the VR environment without moving from one location to another location.

In another embodiment is provided for adjusting image data presented in a head mounted display (HMD). This method includes initiating virtual reality (VR) session for an HMD user. The VR session is configured to present image data to a display of the HMD, and the image data are for a VR environment that includes a VR user controlled by the HMD user. The method further includes detecting a type of movement of the VR user in the VR environment as controlled by the HMD user and then identifying a cadence profile for the type of movement. The method also includes adjusting the image data presented on the display of the HMD with the cadence profile when the VR user is moved in the VR environment by the HMD user in accordance with the detected type of movement. The adjusting of the image data with the cadence profile causes a movement of a camera view for the image data that is for the VR environment.

In some embodiments, the cadence profile defines a vertical rhythmic movement of a head of a person while moving in a real world environment, and wherein the cadence profile is obtained from a database.

In some embodiments, the database includes one or more cadence profiles obtained from a calibration operation performed by the HMD user. The calibration operation includes detecting motion from inertial sensors of the HMD when the HMD user is instructed to move in one more types of movements.

In some embodiments, a user account is associated with one or more of the cadence profiles obtained from one or more calibration operations performed by the HMD user in the session or previous sessions.

In some embodiments, the database includes one or more models of cadence profiles, each model being for a type of movement.

In some embodiments, detecting the type of movement includes changing the cadence profile when a different one of the type of movement is detected while the VR user moves about the VR environment.

In some embodiments, the adjusting of the image data is discontinued when the VR user is not moving in the VR environment or is moving within the VR environment in a VR object that does not have a cadence profile.

In some embodiments, the type of movement of the VR user in the VR environment relates to moving from one location to another location within the VR environment. This movement excludes moving associated with looking around the VR environment without moving from one location to another location.

In still another embodiment, a computing system used for providing a virtual reality (VR) environment to a head mounted display (HMD) during a VR session presented to an HMD user is provided. The system includes a display of the HMD and an HMD processing module for rendering the VR environment to be presented on the display of the HMD. The HMD processing module is configured to interface with a motion detection module that identifies when a VR user is moved within the VR environment in response to navigation by the HMD user. The HMD processing module is interfaced with a cadence profile module that identifies a cadence profile to adjust image data presented on the display of the HMD when the VR user is moved.

In some embodiments, cadence profile defines a vertical rhythmic movement of a person while moving in a real world environment, and wherein the cadence profile is obtained from a database.

In some embodiments, the database includes one or more cadence profiles obtained from a calibration operation performed by the HMD user. The calibration operation includes obtaining motion from inertial sensors of the HMD when the HMD user is instructed to move in one more types of movements.

In some embodiments, a user account is associated with one or more of the cadence profiles obtained from one or more calibration operations performed by the HMD user in the session or previous sessions.

In some embodiments, the computing system is one of a game console, a personal computer (PC), a server, a smartphone device, or a remote computer.

In some embodiments, the database includes one or more models of cadence profiles, each model being for a type of movement.

In some embodiments, the adjusting of the image data is discontinued when the VR user is not moving in the VR environment or is moving within the VR environment in a VR object that does not have a cadence profile.

In some embodiments, movement of the VR user in the VR environment relates to moving from one location to another location within the VR environment. The movement excludes moving associated with looking around the VR environment without moving from one location to another location.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

Figure 1:
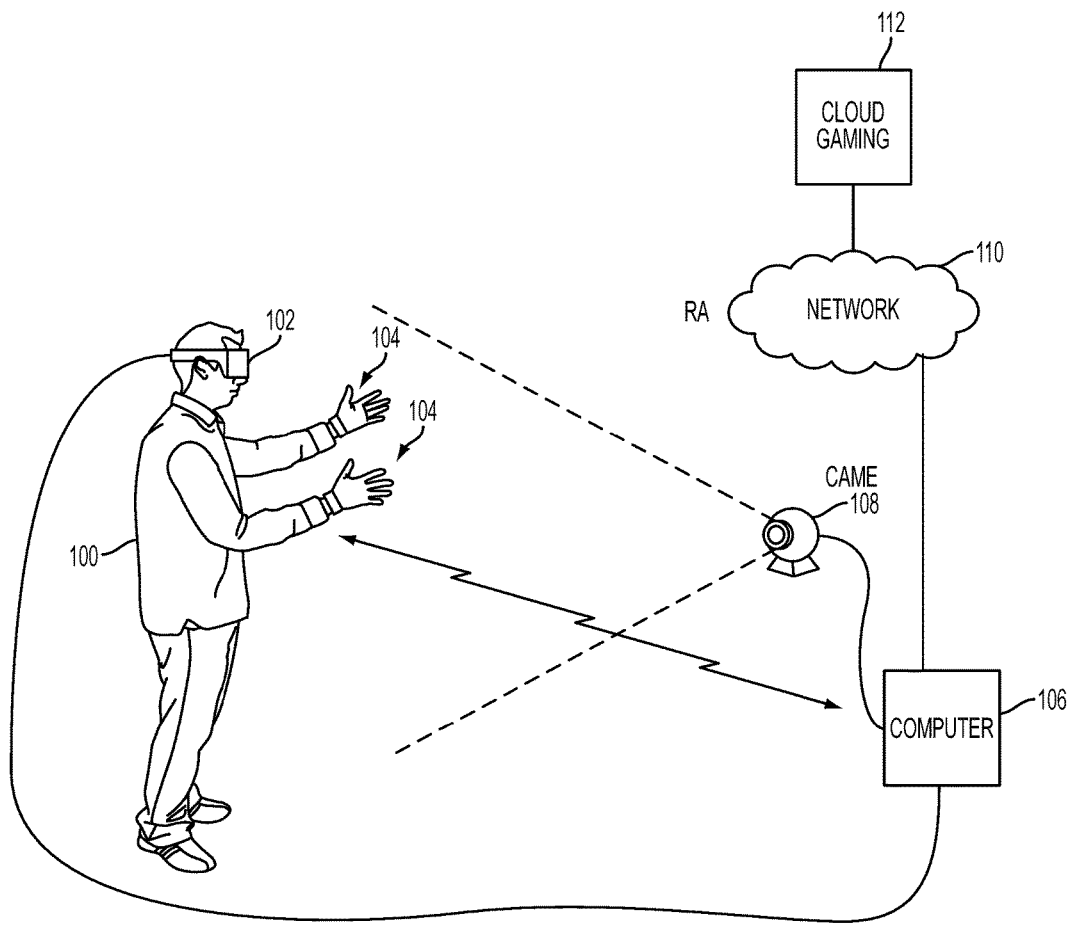
FIG. 1 illustrates a system for interactive gameplay of a video game, in accordance with an embodiment of the disclosure.

The following implementations of the present disclosure provide methods, systems, computer readable media and cloud systems, for applying cadence profile to image data presented in an HMD, to present a more realistic view to an HMD user of movement within the virtual-reality (VR) environments. A cadence profile represents or approximates a type of movement, for example, of a user's head (and body) when the user is walking in normal real-world life. As mentioned below, the cadence profile can have a type of vertical modulation up-and-down and/or side-to-side, which can have different frequencies and rates. The cadence profile, in one embodiment, therefore represents a rhythm movement produced by a user/person, when a type of movement is produced in real world. In one embodiment, it is possible to detect this type of movement using one or more inertial sensors, and therefore calibrate specific movements of a user to specific cadence profiles. The cadence profile can then be used in a virtual reality environment, so that movement within the virtual reality environment proceeds with an applied cadence profile, which matches and/or is approximated to the type of movement performed by a VR user in the real world environment.

One or more of the embodiments described herein address a problem associated with motion sickness, when users become immersed in a virtual reality environment. As noted above, motion sickness sometimes is attributable to immersive action by an HMD user, when the HMD user moves a VR user around the VR environment. By way of example, when a VR user is moved around a VR environment, the VR user appears to slide along an even plane, e.g., as the VR user moves from one location to another location in the VR environment. In the real world, a user typically moves around a real environment with a cadence profile, which is includes a vertical rhythmic movement. For instance, when a user walks from one location to another, the top of the user's head will move along a cadence profile, e.g., modulating up and down. The frequency and amplitude of the cadence profile will depend on the type of movement.

For example, if the user walks slowly, the vertical displacement may be small, yet a vertical rhythmic movement will still be evident. If the user walks fast, runs, skips or hops, the rate of modulation and amplitude may also change. No matter what the rate of modulation or amplitude is, humans will generally exhibit some cadence profile as they move around using their legs. Unfortunately, if VR image data is shown in the display without adjustment for the cadence profile, the HMD user will get the feeling of sliding along some path in the VR environment. This feeling is not natural to the HMD user, and for this reason, the HMD user may get motion sickness since the expected cadence profile is not present when the VR user (i.e., character moved in the VR environment, or first-person view into the VR environment) appears to slide around.

In one embodiment, it is possible to apply an adjustment to the image data shown in the HMD display so that a cadence profile is included in the image data, when the VR user is moved around. In one embodiment, the cadence profile can be obtained from a file or from a database of known or expected cadence profiles. Cadence profiles can be defined for different types of movement, e.g., walking, running, hopping, jumping, walking slow, walking fast, etc. In one embodiment, the VR content can be analyzed to determine when the VR user is moving, and then the correct cadence profile can be selected to adjust the image data. In other embodiments, a program, game, media, etc., can be programmed to apply a particular cadence profile depending on the movement of the VR user or VR character in the VR environment.

In other embodiments, a cadence profile can be obtained from a calibration operation. By way of example, an HMD user can be instructed to take some steps, or move in different directions. The inertial sensors in the HMD (or device associated with the HMD) can capture motion information during the instructed movement. In one specific example, the HMD may include one or more gyroscopes and/or accelerometers, which can capture the motion to detect the cadence profile. In one embodiment, the cadence profile can appreciate the actual head movement that the user makes when the player walks, runs, hops, takes a few steps, etc.

This information, which defines the cadence profile, can be used to make adjustments to the image data, such that a camera view into the VR environment can be adjusted similar to how the real world user wearing the HMD would move. Thus, effect would therefore provide a realistic view to the HMD user, who normally would expect to see some cadence profile when movement occurs in a real world environment. In this manner, the movements in the VR environment will approximate movements in the real world, thus acting to reduce motion sickness. The adjustments for cadence profile can be applied to any type of content. The content can be, for example, video games, movies, interactive demos, tours of places, exhibits, and/or combinations thereof.

In one embodiment, the methods, systems, image capture objects, sensors and associated interface objects (e.g., gloves, controllers, hands, etc.) are configured to process data that is rendered in substantial real time on a display screen. The display may be the display of a head mounted display (HMD), a display of a second screen, a display of a portable device, a computer display, a display panel, a display of one or more remotely connected users (e.g., whom may be viewing content or sharing in an interactive experience), or the like.

It will be obvious, however, to one skilled in the art, that the present disclosure may be practiced without some or all of these specific details. In other instances, well known process operations have not been described in detail in order not to unnecessarily obscure the present disclosure.

FIG. 1 illustrates a system for interactive gameplay of a video game, in accordance with an embodiment of the disclosure. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate a glove interface object 104a to provide input for the video game. Additionally, a camera 108 can be configured to capture images of the interactive environment in which the user 100 is located. These captured images can be analyzed to determine the location and movements of the user 100, the HMD 102, and the glove interface object 104a. In one embodiment, the glove interface object 104a includes a light which can be tracked to determine its location and orientation.

As described below, the way the user interfaces with the virtual reality scene displayed in the HMD 102 can vary, and other interface devices in addition to glove interface objects 104a, can be used. For instance, single-handed controllers can also be used, as well as two-handed controllers. In some embodiments, the controllers can be tracked themselves by tracking lights associated with the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the glove interface object 104a and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the glove interface object 104a.

In one embodiment, the HMD 102, glove interface object 104a, and camera 108, may themselves be networked devices that connect to the network 110 to communicate with the cloud gaming provider 112. For example, the computer 106 may be a local network device, such as a router, that does not otherwise perform video game processing, but which facilitates passage of network traffic. The connections to the network by the HMD 102, glove interface object 104a, and camera 108 may be wired or wireless.

Additionally, though embodiments in the present disclosure may be described with reference to a head-mounted display, it will be appreciated that in other embodiments, non-head mounted displays may be substituted, including without limitation, a television, projector, LCD display screen, portable device screen (e.g. tablet, smartphone, laptop, etc.) or any other type of display that can be configured to render video and/or provide for display of an interactive scene or virtual environment in accordance with the present embodiments.

Figure 2A:
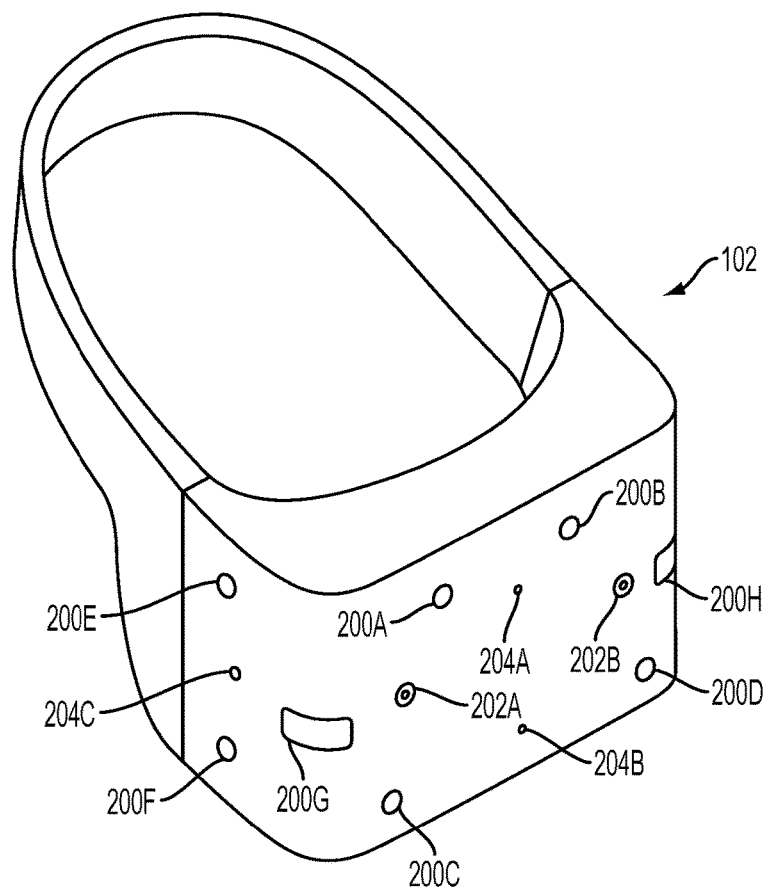
FIG. 2A illustrates a head-mounted display (HMD), in accordance with an embodiment of the disclosure.

FIG. 2A illustrates a head-mounted display (HMD), in accordance with an embodiment of the disclosure. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source.

This information can be utilized in various ways, including exclusion of unwanted sound sources, association of a sound source with a visual identification, etc.

Figure 3:
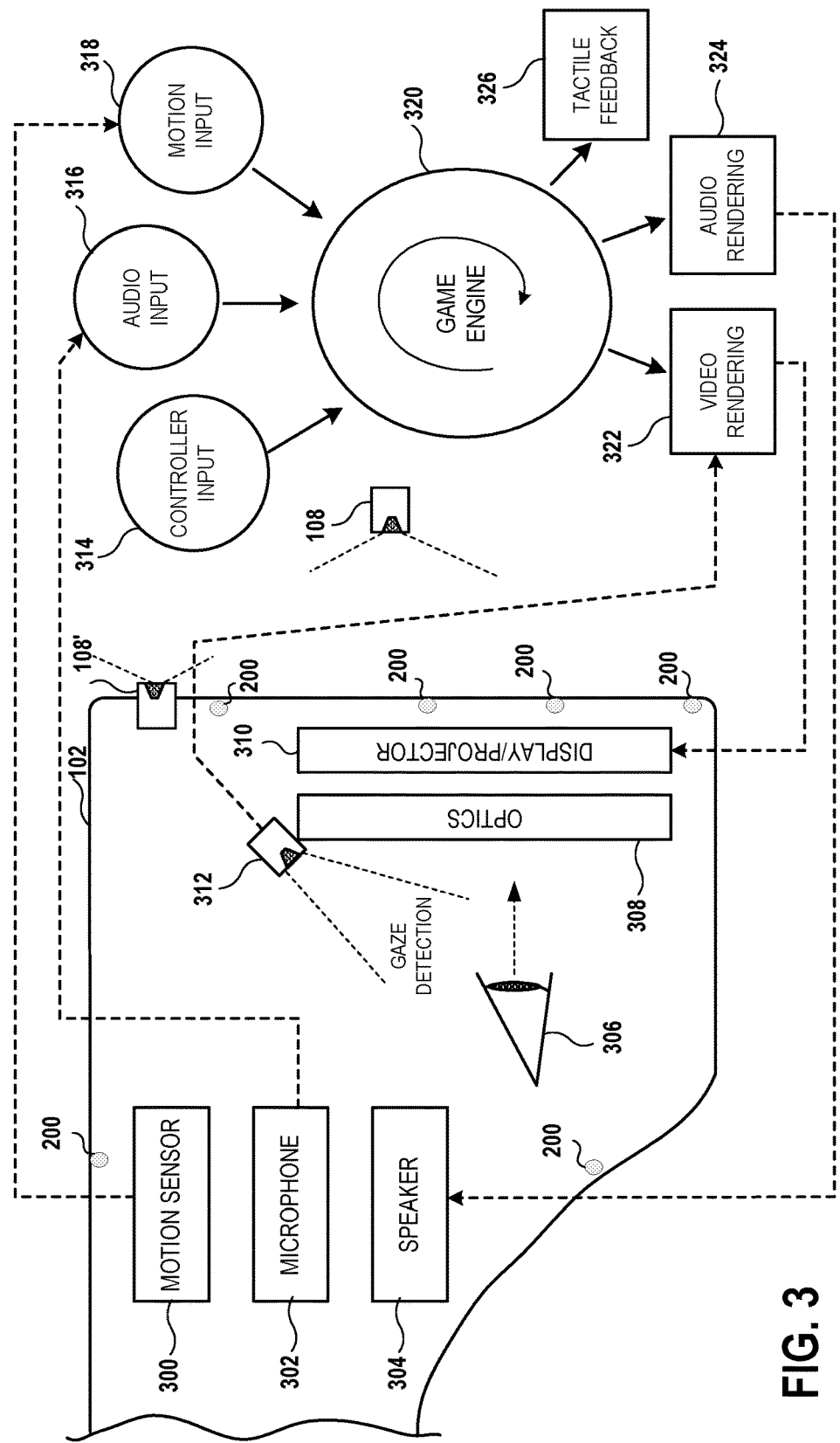
FIG. 3 conceptually illustrates the function of an HMD in conjunction with an executing video game, in accordance with an embodiment of the disclosure.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B (e.g., or one or more front facing cameras 108' disposed on the outside body of the HMD 102, as shown in FIG. 3 below) can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 2B:
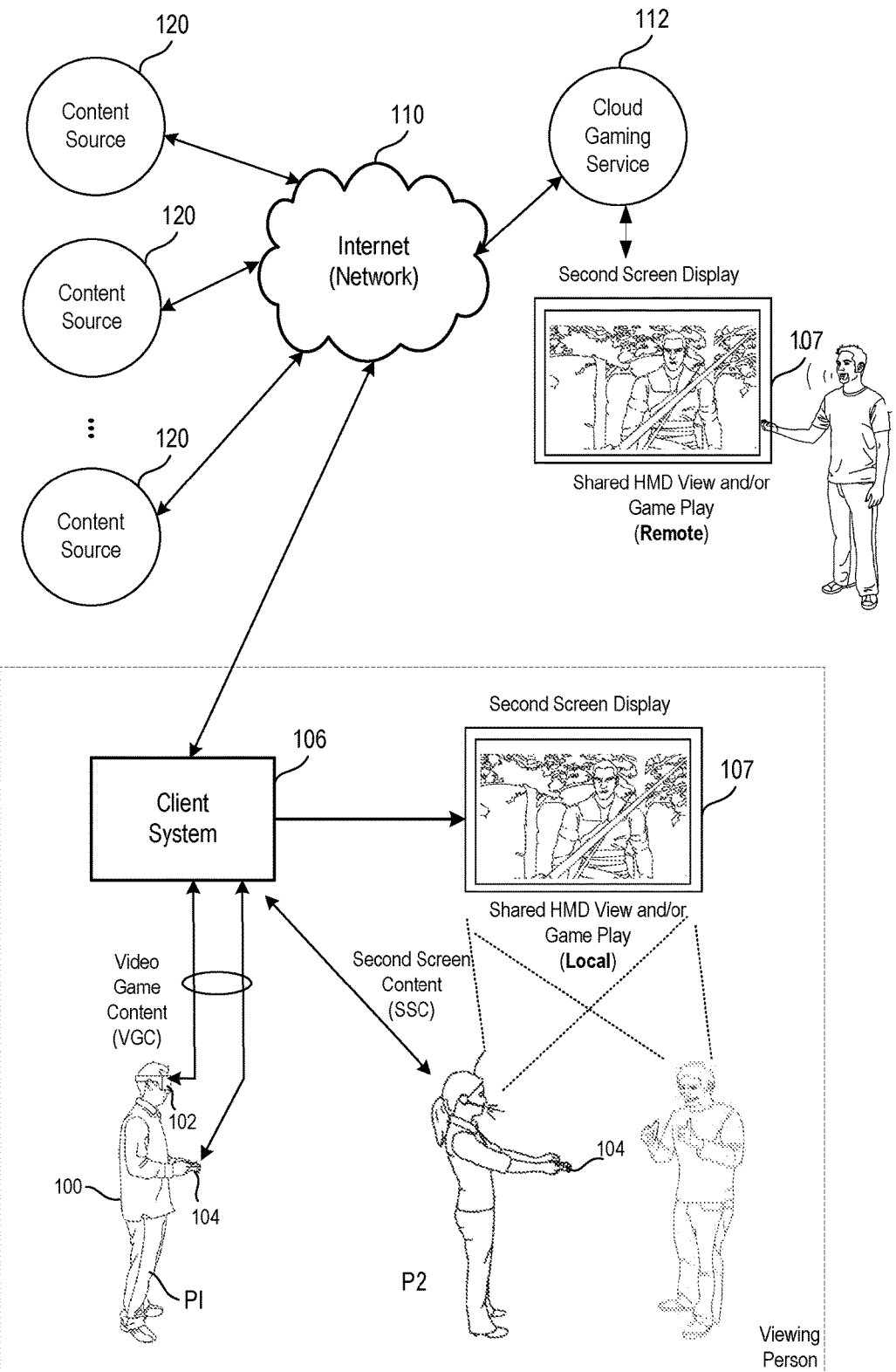
FIG. 2B illustrates one example of an HMD user interfacing with a client system, and the client system providing content to a second screen display, which is referred to as a second screen, in accordance with one embodiment.

FIG. 2B illustrates one example of an HMD 102 user interfacing with a client system 106, and the client system 106 providing content to a second screen display, which is referred to as a second screen 107. As will be described below, the client system 106 may include integrated electronics for processing the sharing of content from the HMD 102 to the second screen 107. Other embodiments may include a separate device, module, connector, that will interface between the client system and each of the HMD 102 and the second screen 107. In this general example, user 100 is wearing HMD 102 and is playing a video game using controller 104. The interactive play by user 100 will produce video game content (VGC), which is displayed interactively to the HMD 102.

In one embodiment, the content being displayed in the HMD 102 is shared to the second screen 107. In one example, a person viewing the second screen 107 can view the content being played interactively in the HMD 102 by user 100. In another embodiment, another user (e.g. player 2) can interact with the client system 106 to produce second screen content (SSC). The second screen content produced by a player also interacting with the controller 104 (or any type of user interface, gesture, voice, or input), may be produced as SSC to the client system 106, which can be displayed on second screen 107 along with the VGC received from the HMD 102.

Accordingly, the interactivity by other users who may be co-located or remote from an HMD user can be social, interactive, and more immersive to both the HMD user and users that may be viewing the content played by the HMD user on a second screen 107. As illustrated, the client system 106 can be connected to the Internet 110. The Internet can also provide access to the client system 106 to content from various content sources 120. The content sources 120 can include any type of content that is accessible over the Internet.

Such content, without limitation, can include video content, movie content, streaming content, social media content, news content, friend content, advertisement content, etc. In one embodiment, the client system 106 can be used to simultaneously process content for an HMD user, such that the HMD is provided with multimedia content associated with the interactivity during gameplay. The client system 106 can then also provide other content, which may be unrelated to the video game content to the second screen. The client system 106 can, in one embodiment receive the second screen content from one of the content sources 120, or from a local user, or a remote user.

FIG. 3 conceptually illustrates the function of the HMD 102 in conjunction with an executing video game, in accordance with an embodiment of the disclosure. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as a handheld gaming controller (e.g. Sony DUALSHOCK®4 wireless controller, Sony PlayStation® Move motion controller) or glove interface object 104a. By way of example, controller input 314 may include directional inputs, button presses, trigger activation, movements, gestures, or other kinds of inputs processed from the operation of a gaming controller. The audio input 316 can be processed from a microphone 302 of the HMD 102, or from a microphone included in the image capture device 108 or elsewhere in the local environment. The motion input 318 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 312, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 326 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

At present, streaming services for sharing game replays are very popular. The DualShock®4 wireless controller includes a "share button" directly on the controller to enable such sharing. Implementations of the present disclosure improve sharing replays for people who wish to explore the replays using an HMD/VR headset. Implementations of the present disclosure provide for rendering of a game replay with a very wide field of view to allow the spectator to move his head freely using an HMD and view the replay from novel vantage points. The traditional streaming approach would limit the replay to only what the original player viewed, so that the view direction would be independent of the spectator's head position and orientation, and if the spectator using an HMD moved his head, nothing would change.

Implementations of the disclosure provide for the rendering of videos in a wide enough field of view to support novel viewpoints in an HMD. A custom build of a game engine that runs on a cloud server (e.g. on console gaming hardware, e.g. PlayStation®4 hardware, in the cloud), that accepts as input game state streamed from the original player's game engine and uses it to render an extremely wide field of view (e.g. 150 degree plus) view of the game, that can then be used for real-time streaming and/or pre-recorded playback of that game session. It will be appreciated that the extremely wide field of view is in excess of the HMD's field of view, allowing for the spectator wearing the HMD to look around in the replay. The actual game is configured to stream its state to the networked version of the engine.

As described above, there is a need to provide users the ability to spectate, e.g., watch the interactive activity being experienced by users wearing HMDs 102. For example, one HMD virtual reality player may be immersed in the activity presented in the HMD, while other persons may be co-located with the player. These other co-located players may find enjoyment in watching the interactivity experienced or virtual reality scene being viewed by the HMD player. As used herein, an HMD player is one that is viewing content presented on the HMD, or can be one that is interacting with some content resented on the HMD, or can be playing a game presented on the HMD. As such, reference to the player, is only made with reference to the user that is wearing the HMD, irrespective of the type of content being presented on the HMD.

In still other embodiments, other persons that are not co-located with the HMD player may wish to view the content, interactivity, or media being presented in the HMD of the HMD player. For instance, a website may be provided to present users with the ability to select from different HMD players, so as to watch and spectate while the HMD player performs his or her activities. This example is similar to standard Twitch-type experiences, which allow users connected to the Internet to access the website and search for different types of content or media being played by remote players. The remote players may, in some embodiments, be playing games using an HMD 102.

In other embodiments, the remote players may be playing games or watching content using a display screen of a device or a television display screen. Broadly speaking, users wishing to watch the activity of another player that is remote, e.g., over a website, can then select specific players or types of games, or thumbnails of the games, or thumbnails of the content, to view the activity being directed by the HMD player. Thus, a website can be provided that enables users to view and select specific interactive content that may be actively played by a remote HMD player. The remote viewer wishing to view the activity by the HMD player, can simply click on that content and begin watching.

The person watching and viewing the actions by the HMD player is generally referred to as a spectator. Spectators are those persons who are given access to view the activities, interactivities, actions, movements, etc., but are not necessarily controlling the game action. For this reason, these viewers are referred to as spectators. In the context of an HMD player, the content being presented in the HMD display is dynamic and is controlled by the movements of the HMD player. For example, when the HMD player moves his or her head around, that player is presented with different content that is viewable, similar to the way real world viewing of a person's surroundings can occur.

Figure 4:
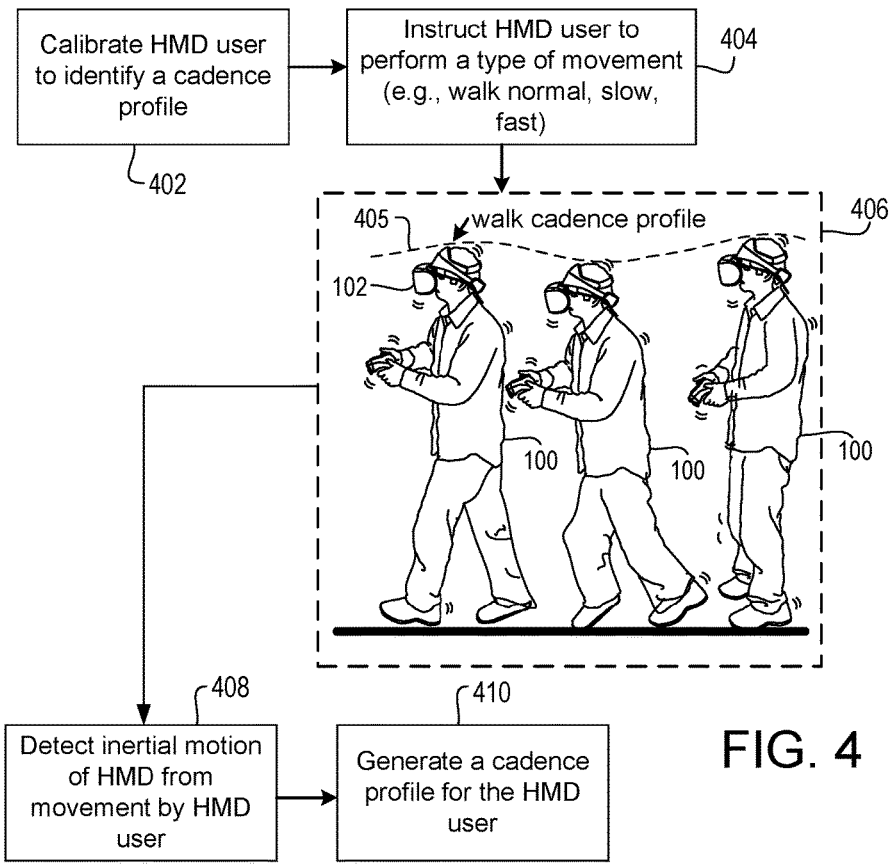
FIG. 4 illustrates an example of calibration operations performed to identify a cadence profile or multiple cadence profiles of a user, so as to enable utilization of the cadence profile in a virtual environment presented by way of an HMD.

FIG. 4 illustrates an example method for calibrating an HMD user 100, to identify one or more cadence profiles, in accordance with one embodiment. In this example, operation 402 indicates an operation performed by the computing device to initiate a calibration operation for the HMD user to identify a cadence profile. By way of example, before commencing a session for a particular game, or movie, or multimedia content, or virtual-reality environment, or generally content to be displayed in a display of an HMD, a calibration operation may be initiated. In one embodiment, a particular game title can require that the HMD user be calibrated to identify his or her specific cadence profile. In some embodiments, certain games or content can omit the calibration process, and instead utilize standard calibration models.

If calibration is to proceed, operation 404 shows that the HMD user 100 can be provided with text, audio, or some other notification to instruct the HMD user how the calibration process is to proceed. For example, the HMD user can be instructed to perform a type of movement, which can then be captured by one or more sensors, cameras, or combination of sensors and cameras. In one specific example, the HMD user 100 can be instructed to walk forward 2 or 3 steps, so as to enable identification of a cadence profile 405, which is for walking by the HMD user 100. Illustration 406 shows user 100 taking several steps forward and showing that the cadence profile for walking 405 is produced because the user's head moves up and down slightly during the walking.

This is a type of vertical displacement, relative to the ground, which causes a type of rhythm and modulation in height of the user's head, as the user walks. This modulation in rate and amplitude defines the cadence profile 405 for user 100, which is detected during the calibration in operation 408. In one embodiment, the detection is enabled by capturing information from inertial sensors of the HMD 102 that is worn by the HMD user 100. The inertial sensors of the HMD 102, may include one or more gyroscopes and/or one or more accelerometers. The inertial motion produced when the HMD user 100 walks is therefore captured by the inertial sensors, which therefore produce or generate a cadence profile in operation 410 for the HMD user.

In one embodiment, other calibration operations can also be performed, whereby the HMD user 100 is instructed to perform different types of movement. The different types of moving can include, for example, to walk fast, walk slow, Skip, jump, pop, run, jog, crouch, kneel, sit, laydown, move between positions, etc. These different types of movements can then be classified and assigned their own specific cadence profile 405. In one embodiment, different users will have different cadence profiles, as different people have different ways of walking or moving. Therefore, some embodiments will allow for calibration to be performed in a custom way for each specific HMD user. The custom calibrations of the cadence profiles can therefore be saved and associated with a user account of the HMD user 100. In this manner, subsequent virtual-reality sessions that can utilize cadence profiles can reach out to the previously saved calibrations, so as to implement user specific cadence profiles.

As mentioned above, it is also possible to produce a model of cadence profiles for different types of movements. The model of a cadence profile for walking will have a different modulation and amplitude than does one for running, hopping, etc. As such, one embodiment will enable the virtual-reality content or system executing virtual-reality content to dynamically select the cadence profile to apply based on the movements being made by a VR user that is in the VR environment.

As mentioned above, the VR user may be thought of as the character being moved within the VR environment, as controlled by the HMD user. The character may also be the HMD user or avatar of the HMD user. In still another example, the image data is viewable by the HMD user as if the HMD user were actually in the VR environment and the HMD user is the VR user. The VR user can also be thought of as a first-person in the VR environment, e.g., such as in a first-person shooter game or as if HMD user were in the VR environment and can move around within one or more spaces or scenes of the VR environment. In other embodiments, the VR user represents a view analogous to that which would be captured by a virtual camera that is looking into or is in the VR environment from a position above the head of the HMD user or from a position or perspective of the eyes of the HMD user. In either configuration, the cadence profile is utilized to modify the image data presented on the display of the HMD 102, when the VR user is moved within the VR environment.

Thus, as the VR user traverses around from location to location within the VR environment, a camera view provided by way of the image data to the display of the HMD will move slightly to replicate or follow the cadence profile of the HMD user 100. In one embodiment, the cadence profile applied to the image data can be geared to a different ratio than a one-to-one ratio. For instance, some embodiments may enable an application, or system program to gear the application of the cadence profile to specific content being played or shown in the VR environment to the HMD 102. For example, even if the VR user is moved quickly inside of the VR environment, the cadence profile used may be geared downward so that the cadence profile adjustment made to the image data is reduced. In other embodiments, the gearing may be applied to increase the amount of cadence profile adjustment made to the image data presented in the HMD 102. In still other embodiments, the gearing can be dynamically adjusted, such that the cadence profile is applied at different rates to different movements made using the VR user, depending on the content displayed in the VR environment.

Figure 5:
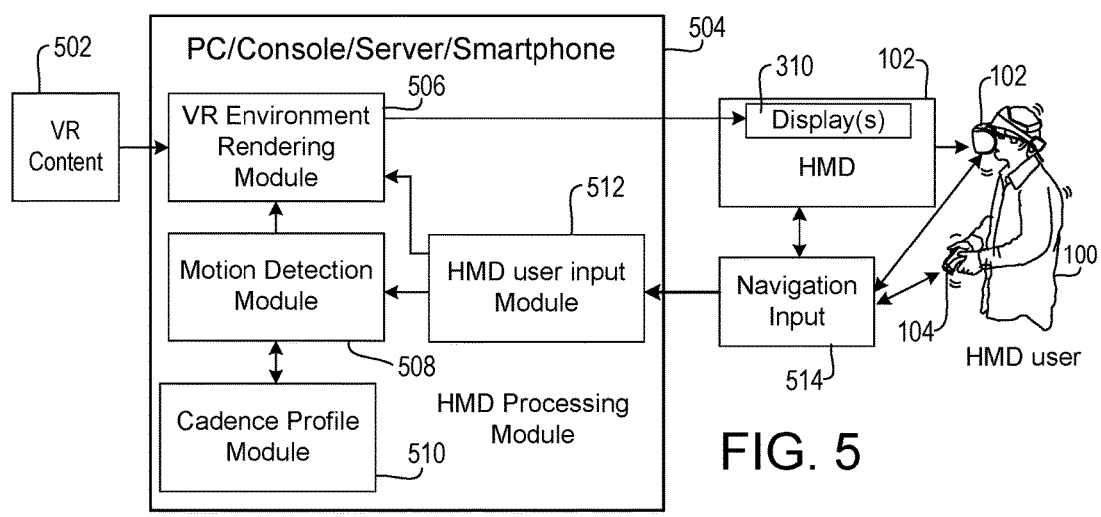
FIG. 5 illustrates example processing modules that can render VR environments, detect motions in the VR environment, and apply cadence profiles to image data presented to the display of an HMD, in accordance with one embodiment.

FIG. 5 illustrates an example of an HMD processing module 504, which can process VR environment rendering for an HMD 102, and apply cadence profiles to adjust the image data based on movements of the VR user in the VR environment, in accordance with one embodiment. The HMD processing module 504 may be executed by a personal computer, a game console, a server, a smart phone, or other type of computing device. By way of example, a personal computer may be capable of processing the VR environment rendering and also apply the cadence profile adjustments.

The output is then provided to the HMD 102. Similarly, the game console can be connected to the HMD 102, and can also process the VR environment and apply the cadence profiles. In still other embodiments, a server, e.g. used for streaming VR content can provide the VR environment to the HMD 102, and also apply the cadence profile for different types of movement. Further embodiments can also include utilization of an HMD 102 that is coupled to a smart phone, when a smart phone display is interfaced to a headset that defines part of the HMD 102. In the smartphone example, the smartphone would execute the VR environment rendering and also apply the cadence profiles depending on the movements performed by a VR user in the VR environment.

As shown, the HMD processing module 504 includes a VR environment rendering module 506. The VR environment rendering module 506 may include a game engine or processing engine that processes a game or movie or virtual-reality content in general. The VR content 502 is supplied to the HMD module 504. The VR content 502 can be obtained from local storage, or can be obtained from a remote location over a network. A motion detection module 508 is configured to work with the VR environment module 506 so as motion by VR user in a VR environment can be detected.

By way of example, if the HMD user 100 is providing navigation input 514 to the HMD user input module 512, that navigation can be examined to determine if the HMD user 100 is moving a VR user within the VR environment. Based on the type of movement that the VR user has been moved within the VR environment, the cadence profile module 510 can identify a corresponding cadence profile. As mentioned above, the cadence profile can be custom to the VR user, and can be obtained from one or more previous calibration sessions. Alternatively, the cadence profile can be obtained from a file or a database local or in the cloud, which stores one or more cadence profile models for the type of movement detected by the VR user in the VR environment, as controlled by the HMD user 100.

The VR environment rendering module 506 will therefore produce image data to the displays 310 of the HMD 102, which include an adjustment to the image data so as to include the cadence profile selected for the specific type of movement by the VR user in the VR environment. As mentioned above, the adjustment to the image data provided to the HMD 102 can include an adjustment to the camera motion that is presented to the HMD, so that the motion of the VR environment appear similar to that viewed by a user in the real world that walks or moves with a specific cadence profile.

Figure 6:
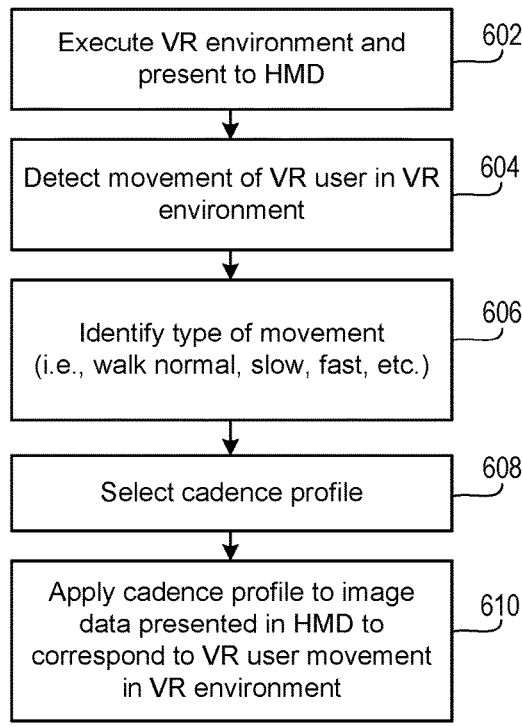
FIG. 6 illustrates one method operation used to detect movement by a VR user in a VR environment, and apply the cadence profile to the image data presented in the HMD, in accordance with one embodiment.

FIG. 6 illustrates a flowchart diagram depicting one example for applying a cadence profile to image data presented in an HMD, in accordance with one embodiment. In this example, operation 602 includes execution of a VR environment and presentation to an HMD. During the execution of the VR environment, operation 604 can detect movement of a VR user in the VR environment. The movement of the VR user in the VR environment includes moving the user from one location to another location. The movement defined herein, for example, does not include movement by the HMD user's head to look around a specific environment.

This is considered movement of the HMD, but not movement of the VR user within the VR environment. In operation 606, the type of movement is identified. The movement can be identified, for example to be walking normal, slow walking, fast walking, and other examples described herein. In operation 608, a cadence profile is selected for the identified type of movement. Operation 610 will therefore apply the cadence profile to image data presented in the HMD to correspond to VR user movement in the VR environment. As mentioned above, the application of the cadence profile to the image data can be a one-for-one correspondence of the cadence profile of the real user to the cadence profile to be exhibited by the VR user, e.g. by the movements of the camera view into the VR environment.

In other embodiments, it is possible to apply a gearing ratio to the application of the cadence profile to the image data. The gearing ratio can adjust the application of the cadence profile to the image data less magnified in frequency and in amplitude or simply just in frequency or simply just in amplitude. In other embodiments, a gearing ratio can be dynamically set by the program or software executing the virtual reality environment. The dynamic setting of the gearing ratio can be based on the type of activity being performed by the VR user in the VR environment, or simply based on the changes in the types of VR environments that the VR user is entering, leaving, interfacing with, or viewing.

Figure 7:
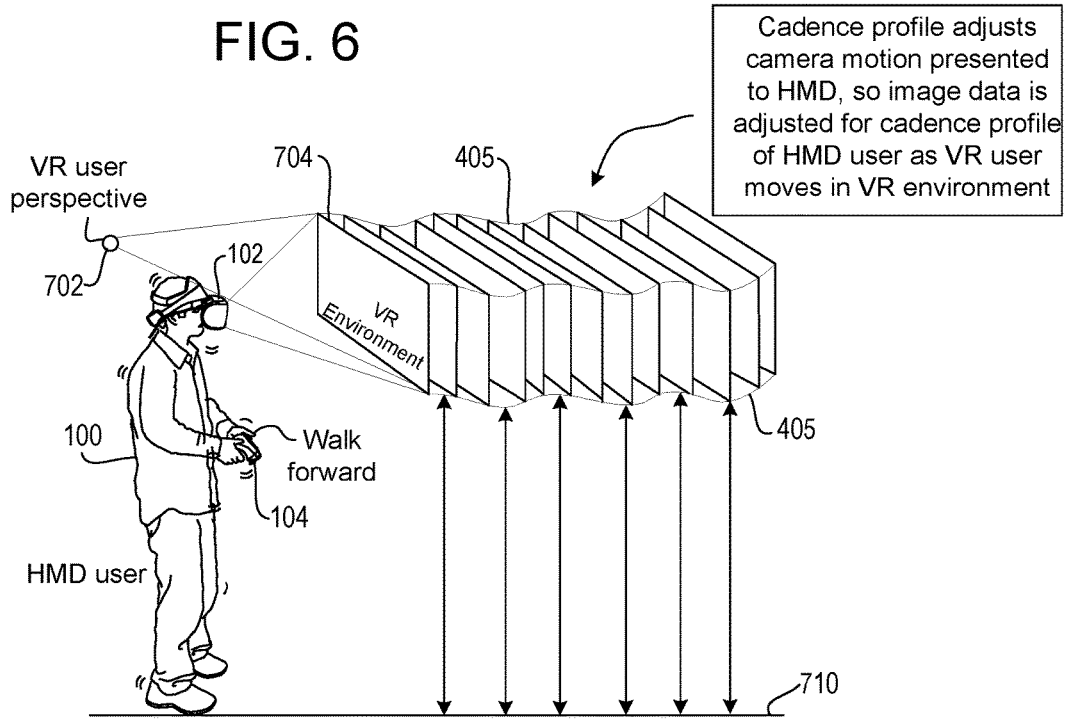
FIG. 7 illustrates a graphical representation of adjustments made to the image data of a VR environment, when presented to an HMD, when a cadence profile is used for adjusting camera motion, in accordance with one embodiment.

FIG. 7 illustrates an example of an HMD user 100, viewing a VR environment 704, in accordance with one embodiment. As shown, the view perspectives into the VR environment from the standpoint of the HMD 102 can be adjusted, so that the cadence profile modifies the image data to move in accordance with the selected cadence profile 405. The view perspective of the VR user is shown to be from a point 702, which can be thought of as a virtual camera floating just above and behind the head or just above and in front of the head of the HMD user 100. This provides the illusion to the HMD user 100 that the HMD user 100 is physically in the VR environment 704, and is the VR user. Thus, HMD user 100 can utilize controller 104 to move or walk around the VR environment. One example can include moving the VR user by pushing forward on a joystick on the controller 104, or providing a gesture, or providing a glove interface motion, or combinations thereof.

The illustration of the VR environment 704 moving up and down relative to a reference ground 710, shows that the cadence profiles 405 is applied to the presentation of the VR environment 704, when viewed through the HMD 102 by the HMD user 100. This cadence profile 405 is applied for the specific type of movement being directed and controlled by the HMD user 100 in the VR environment. If the VR user is no longer moving from location to location within the VR environment 704, the cadence profiles 405 is no longer applied or is suspended until the VR user continues to move again. It is also possible to switch between one cadence profile and another cadence profile, e.g., during a specific session of VR interactivity.

By way of example, it is possible to switch between a walking cadence profile, and then a running cadence profile, and then a jumping cadence profile, and then stopping all cadence profile application when the movement of the VR user stops. Thus, the cadence profile selection can be made dynamic, and the application of which and when to apply the cadence profiles enriches the natural viewing of VR environments, which are consistent with those expected by normal real world people. As a result, movement within a VR environment no longer appears to be a sliding motion, but more of a motion that is expected by the real-world user which therefore is believed to reduce motion sickness.

Figure 8:
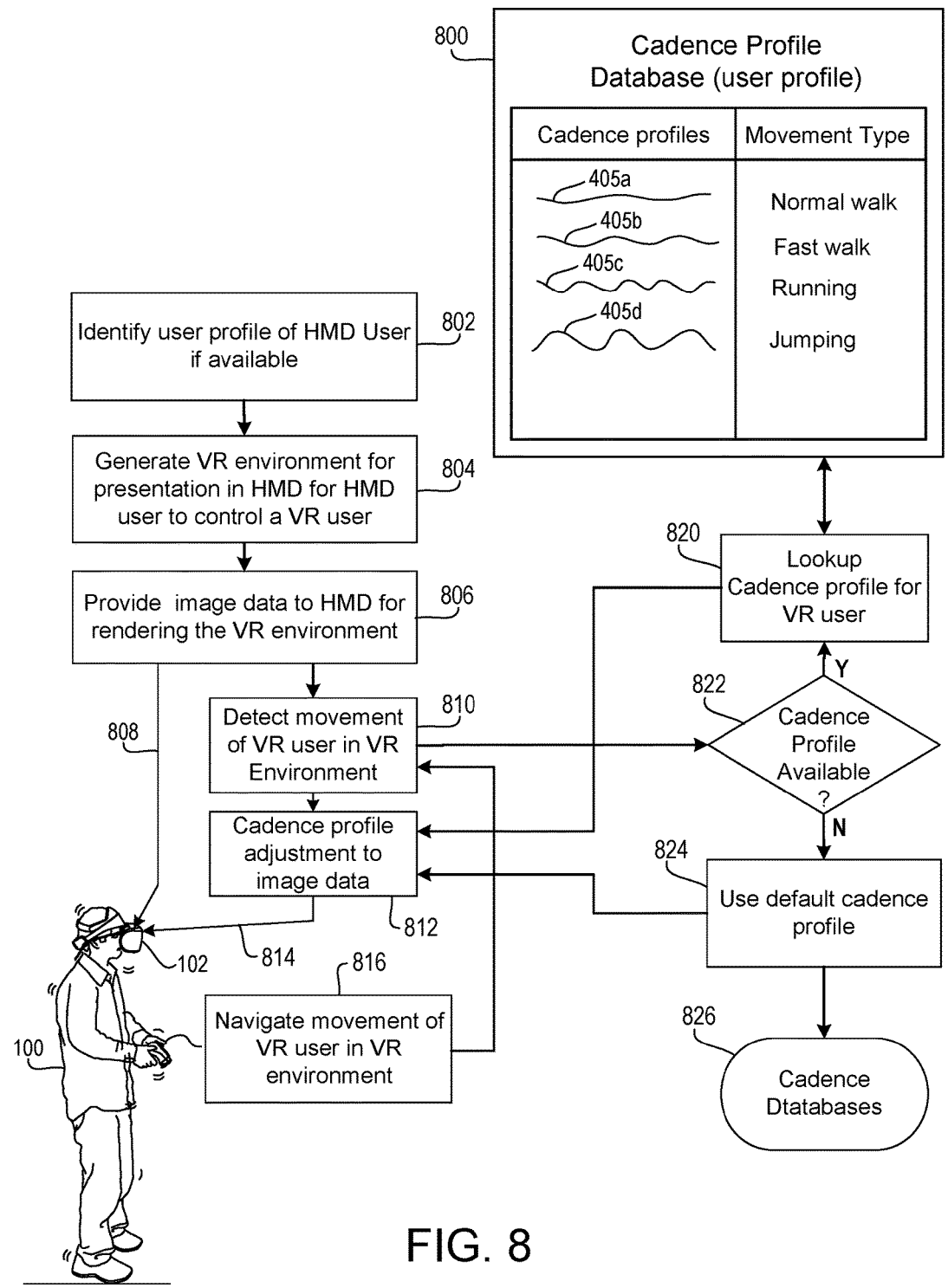
FIG. 8 illustrates an example of generating multiple cadence profiles for different types of movements, and correlating the cadence profiles in a custom manner to specific HMD users, in accordance with one embodiment.

FIG. 8 illustrates an example of the application of a cadence profile for navigational movement of a VR user in the VR environment by a HMD user 100. This process includes identifying a user profile of an HMD user in operation 802, if a prior profile is available. A prior profile may be available if the user has previously engaged in one or more sessions, or has established a profile. In operation 804, the VR environment is generated for presentation in the HMD 102 for the HMD user to control a VR user. In operation 806, image data is provided to the HMD for rendering the VR environment. If the VR user is not being moved around from location to location within the VR environment by the HMD user 100, the VR environment content is simply provided to the HMD 102 via operation 808.

If it is determined that the VR user is being moved within the VR environment in operation 810, the cadence profile is identified for adjustment to the image data in operation 812. In this example, it is determined if the cadence profile is available in operation 822. For instance, if the user has previously performed a calibration and saved one or more cadence profiles, a lookup for cadence profiles for the VR user is performed in operation 820. As shown, a cadence profile database, which may be associated with the user profile of the HMD user 100, may store a plurality of cadence profiles 405a-405d. Each of the cadence profiles can be identified as a type of movement, such as normal walk, fast walk, running, jumping, and other types of motions. These types of movements are only provided by way of example, in many different types of movements can be made by the HMD user during one or more calibrations, which individually can produce any number of cadence profiles.

If it is determined in operation 822 that cadence profiles are not available for the HMD user 100, default cadence profiles can be used in operation 824. The default cadence profiles can be obtained from a cadence database 826, which can store files, data, snippets of data, waveforms, instructions, pointers, or other data that can identify a specific or model cadence profile to use for the detected motion in operation 810. Thus, as the HMD user 100 navigates movement of the VR user in the VR environment in operation 816, this VR user movement can be detected in operation 810, and the appropriate cadence profile adjustment can be made to the image data in operation 812 that is delivered via operation 814 to the HMD 102.

Figure 9:
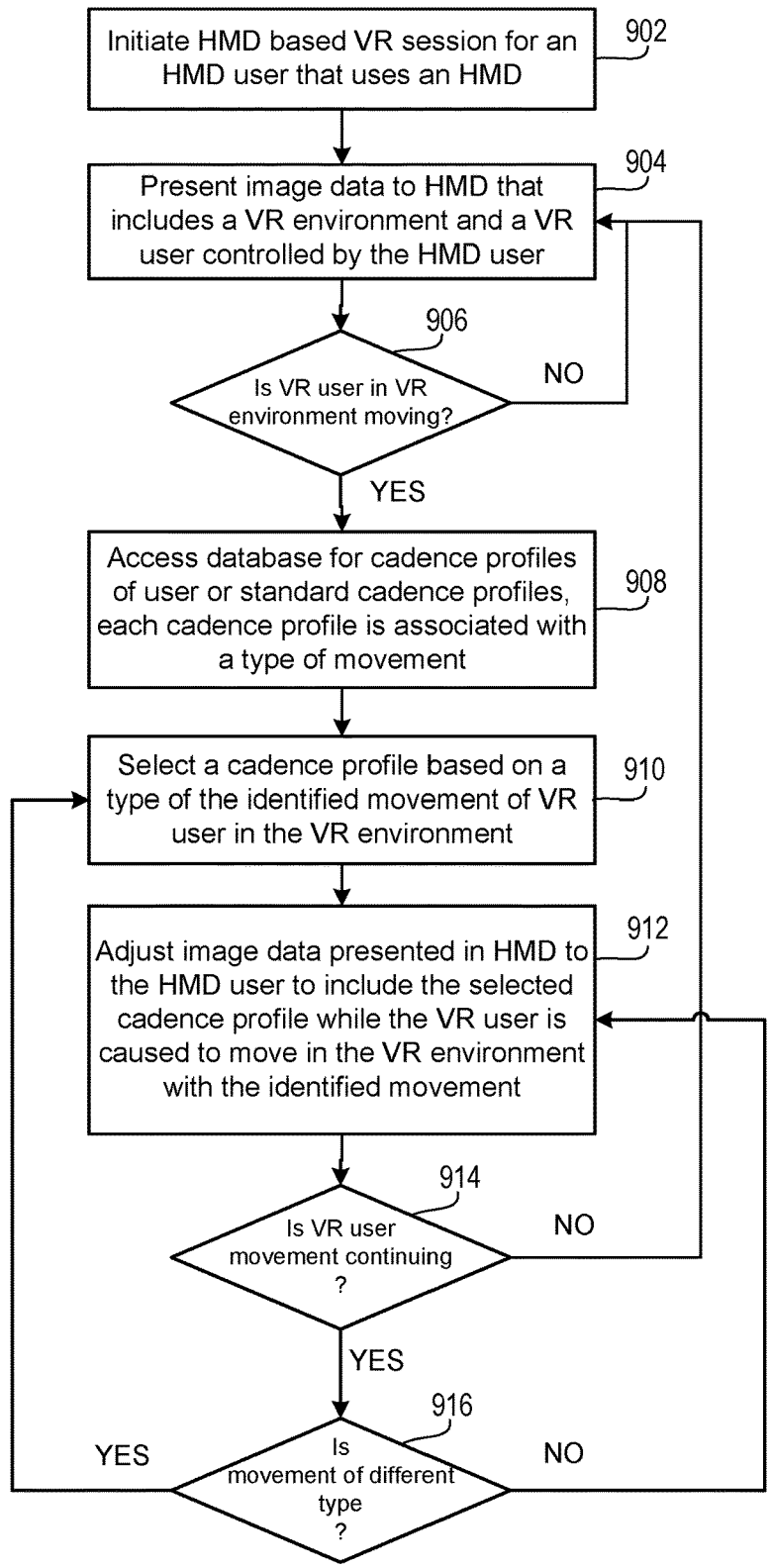
FIG. 9 illustrates an example process of using cadence profiles, and detecting when different types of movements are occurring which require different types of cadence profiles to switch during different phases of interaction by a VR user in a VR environment, in accordance with one embodiment.

FIG. 9 illustrates another method that can be implemented to utilize cadence profiles to adjust image data presented to an HMD, to compensate for vertical rhythmic movements of a user's head, when a user moves about, in accordance with one embodiment. This method begins in operation 902, wherein an HMD based VR session is initiated for an HMD user that uses an HMD 102. In operation 904, image data is presented to the HMD that includes a VR environment and a VR user controlled by the HMD user. The VR user that is included in the VR environment can be represented as a view into the VR environment, such as a camera view into the VR environment. In operation 906, it is determined that the VR user in the VR environment is moving.

If the VR user is not moving, the image data continues to be presented to the HMD without the application of a cadence profile. If it is determined that the VR user in the VR environment is moving, operation 908 will access the database for cadence profiles of the user or standard cadence profiles to identify a cadence profile associated with the type of movement. In operation 910, a cadence profile is selected based on the type of movement identified by the VR user in the VR environment. In other embodiments, the one cadence profile can be used for all movements. In still other embodiments, different cadence profiles can be used for different movements. In operation 912, image data presented in the HMD is adjusted so as to include the selected cadence profile while the VR user is caused to move in the VR environment with the identified movement. As mentioned above, the HMD user 100 can move the VR user or the view into the VR environment using any number of controllers, gloves, bare hands, gestures, voice, gaze direction, or combinations thereof. In operation 914, it is determined that the VR user movement is continuing.

If the VR user movement is not continuing, the image data presented to the HMD will continue in operation 904, without applying any cadence profile. This may occur when the HMD user may be moving his or her head around the view different areas within the VR environment, but the VR user is not moved from location to location within the VR environment. If it is determined that the VR user movement is continuing in operation 914, the process in 916 will determine if the movement is of a different type. By way of example, if the new movement is now running, then the operation moves to operation 910, where different cadence profile is selected for the new movement. If it is determined that the same movement type is occurring, such as the user continues to walk the VR user, the process returns to operation 912 where the image data continues to be adjusted in accordance with the cadence profile.

Figure 10:
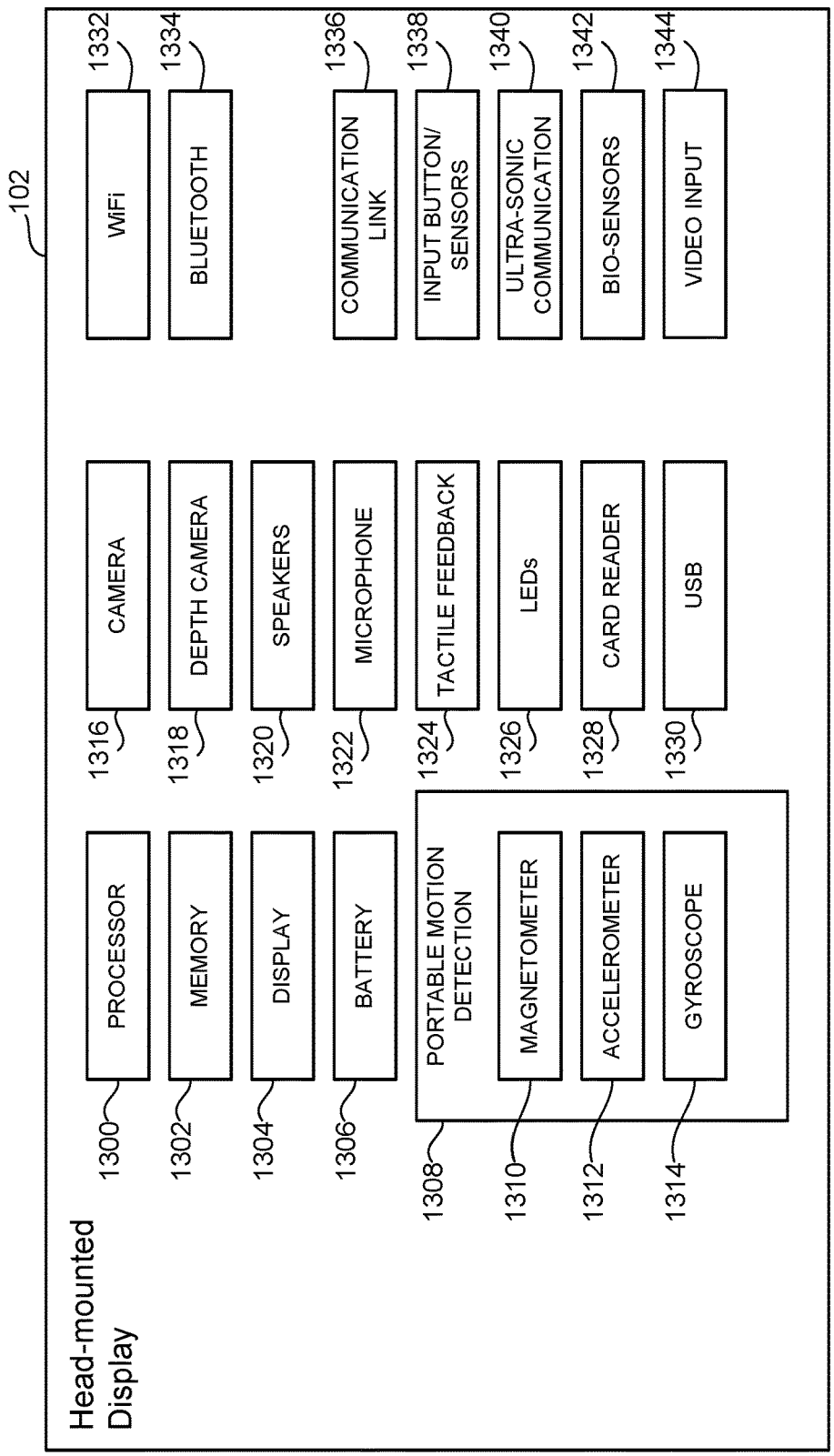
FIG. 10 illustrates components of a head-mounted display, in accordance with an embodiment of the disclosure.

FIG. 10 shows a diagram illustrating components of a head-mounted display 102, in accordance with an embodiment of the disclosure. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet or a local area network via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultra-sonic technologies.

Bio-sensors 1342 are included to enable detection of physiological data from a user. In one embodiment, the bio-sensors 1342 include one or more dry electrodes for detecting bio-electric signals of the user through the user's skin.

A video input 1344 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

Figure 11:
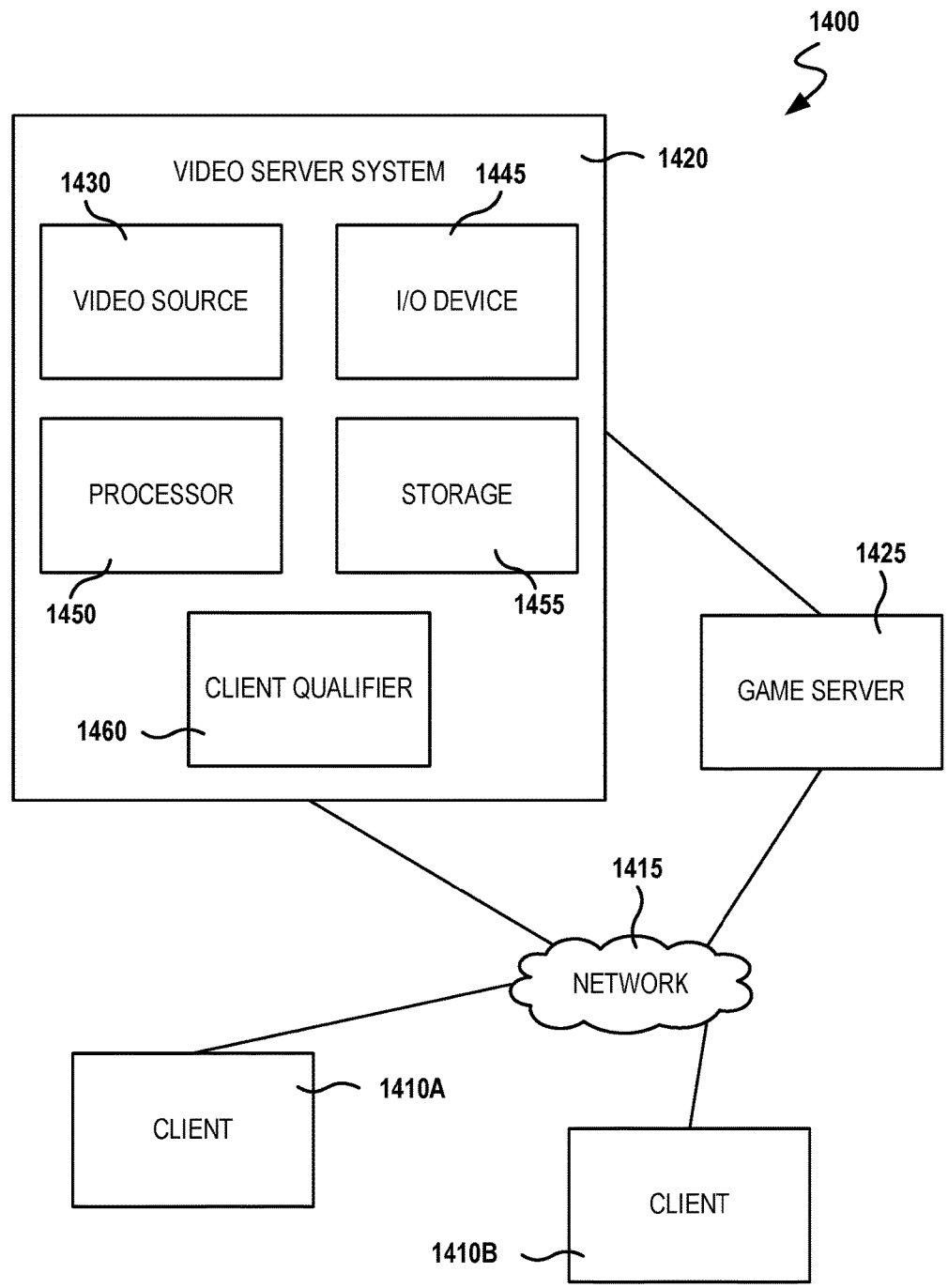
FIG. 11 is a block diagram of a Game System 1400, according to various embodiments of the disclosure.

FIG. 11 is a block diagram of a Game System 1400, according to various embodiments of the disclosure. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the disclosure.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a Client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multi-player game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream, optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure.

What is claimed is:

1. A method for adjusting image data presented in a head mounted display (HMD), comprising,
    executing a virtual reality (VR) session for an HMD user, the VR session is configured to present image data to a display of the HMD, the image data is for a VR environment that includes a VR user controlled by the HMD user;
    receiving navigation input from a controller used by the HMD user, the navigation input is configured for controlling movement of the VR user in and around the VR environment, such that movement of the HMD user around a real world space is independent of the navigation input via the controller that moves the VR user in and around the VR environment; and
    adjusting the image data presented on the display of the HMD with a cadence profile when the VR user is moved in the VR environment responsive to the navigation input by the HMD user,
    wherein the adjusting causes a rhythmic movement up and down to a camera view for the image data that is of the VR environment as viewed from a perspective of the HMD user and as presented on the display of the HMD, wherein the rhythmic movement is consistent with the cadence profile and movement of the HMD user is not used for said adjusting.

2. The method of claim 1, wherein the cadence profile substantially replicates a rhythmic movement of a person while moving in a real world environment, and wherein the cadence profile is obtained from a database.

3. The method of claim 2, wherein the database includes one or more cadence profiles obtained from a calibration operation performed by the HMD user, the calibration operation includes detecting motion from inertial sensors of the HMD when the HMD user is instructed to move in accordance with one or more types of movements.

4. The method of claim 3, wherein a user account used for the VR session is associated with one or more of the cadence profiles obtained from one or more calibration operations performed by the HMD user in the session or in one or more previous sessions.

5. The method of claim 3, wherein the database includes one or more models of cadence profiles, each model being for a type of movement.

6. The method of claim 1, further comprising,
    implementing a different cadence profile when a different type of movement is detected in the VR user as the VR user moves about the VR environment.

7. The method of claim 1, wherein the adjusting of the image data is discontinued when the VR user is not moving in the VR environment or is moving within the VR environment in a VR object that does not have a cadence profile.

8. The method of claim 1, wherein movement of the VR user in the VR environment relates to moving from one location to another location within the VR environment, and excludes moving associated with looking around the VR environment without moving from one location to another location.

9. A method for adjusting image data presented in a head mounted display (HMD), comprising,
    initiating virtual reality (VR) session for an HMD user, the VR session is configured to present image data to a display of the HMD, the image data is for a VR environment that includes a VR user controlled by the HMD user;
    detecting a type of movement of the VR user in the VR environment as controlled by the HMD user, the type of movement is responsive to received navigation input from an input device used by the HMD user, the navigation input is configured for controlling movement of the VR user around the VR environment, such that movement of the HMD user around a real world space is independent of movement of the VR user that is responsive to the navigation input via the input device that moves the VR user around the VR environment; and
    identifying a cadence profile for the type of movement; and
    adjusting the image data presented on the display of the HMD with the cadence profile when the VR user is moved in the VR environment by the HMD user using the input device in accordance with the detected type of movement,
    wherein adjusting the image data with the cadence profile causes a rhythmic movement of a camera view up and down for the image data that is for the VR environment as presented on the display of the HMD for viewing by the HMD user, wherein movement of the HMD user is not used for said adjusting.

10. The method of claim 9, wherein the cadence profile defines a rhythmic movement of a head of a person while moving in a real world environment, and wherein the cadence profile is obtained from a database.

11. The method of claim 10, wherein the database includes one or more cadence profiles obtained from a calibration operation performed by the HMD user, the calibration operation includes detecting motion from inertial sensors of the HMD when the HMD user is instructed to move in one more types of movements.

12. The method of claim 11, wherein a user account is associated with one or more of the cadence profiles obtained from one or more calibration operations performed by the HMD user in the session or previous sessions.

13. The method of claim 11, wherein the database includes one or more models of cadence profiles, each model being for a type of movement.

14. The method of claim 9, wherein detecting the type of movement includes changing the cadence profile when a different one of the type of movement is detected while the VR user moves about the VR environment.

15. The method of claim 9, wherein the adjusting of the image data is discontinued when the VR user is not moving in the VR environment or is moving within the VR environment in a VR object that does not have a cadence profile.

16. The method of claim 9, wherein the type of movement of the VR user in the VR environment relates to moving from one location to another location within the VR environment, and excludes moving associated with looking around the VR environment without moving from one location to another location.

17. A computing system used for providing a virtual reality (VR) environment to a head mounted display (HMD) during a VR session presented to an HMD user, comprising,
   a display of the HMD; and
   an HMD processing module for rendering the VR environment to be presented on the display of the HMD, the HMD processing module is configured to interface with a motion detection module that identifies when a VR user is moved within the VR environment in response to navigation by the HMD user via an input device, such that movement of the VR user from one location to another location in the VR environment is independent of movement of the HMD user in locations in a real world space, the HMD processing module is interfaced with a cadence profile module that identifies a cadence profile to adjust image data with a rhythmic movement up and down, such that the adjusted image data is presented on the display of the HMD when the VR user is moved,
   wherein movement of the HMD user is not used for said adjusting image data with the rhythmic movement up and down.

18. The computing system of claim 17, the cadence profile defines a rhythmic movement of a person while moving in a real world environment, and wherein the cadence profile is obtained from a database.

19. The computing system of claim 18, wherein the database includes one or more cadence profiles obtained from a calibration operation performed by the HMD user, the calibration operation includes obtaining motion from inertial sensors of the HMD when the HMD user is instructed to move in one more types of movements.

20. The computing system of claim 17, wherein a user account is associated with one or more of the cadence profiles obtained from one or more calibration operations performed by the HMD user in the session or previous sessions.

21. The computing system of claim 17, wherein the computing system is one of a game console, a personal computer (PC), a server, a smartphone device, or a remote computer.

22. The computing system of claim 17, wherein the database includes one or more models of cadence profiles, each model being for a type of movement.

23. The computing system of claim 17, wherein the adjusting of the image data is discontinued when the VR user is not moving in the VR environment or is moving within the VR environment in a VR object that does not have a cadence profile.

24. The computing system of claim 17, wherein movement of the VR user in the VR environment relates to moving from one location to another location within the VR environment, and excludes moving associated with looking around the VR environment without moving from one location to another location.

* * * * *